(12) United States Patent
Hultgren

(10) Patent No.: US 8,506,441 B2
(45) Date of Patent: Aug. 13, 2013

(54) DIFFERENTIAL GEAR FOR A MULTI-SHAFT WHEELED MOTOR VEHICLE, AND A DRIVE TRAIN COMPRISING SEVERAL SUCH DIFFERENTIAL GEARS

(75) Inventor: Joakim Hultgren, Gideå (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 1290 days.

(21) Appl. No.: 12/162,972

(22) PCT Filed: Feb. 2, 2007

(86) PCT No.: PCT/SE2007/050056
§ 371 (c)(1),
(2), (4) Date: Nov. 21, 2008

(87) PCT Pub. No.: WO2007/091963
PCT Pub. Date: Aug. 16, 2007

(65) Prior Publication Data
US 2009/0203488 A1    Aug. 13, 2009

(30) Foreign Application Priority Data
Feb. 10, 2006    (SE) ........................................ 0600297

(51) Int. Cl.
*F16H 48/20* (2012.01)
(52) U.S. Cl.
USPC .......................................................... 475/231

(58) Field of Classification Search
USPC .......................................................... 475/231
See application file for complete search history.

(56) References Cited

U.S. PATENT DOCUMENTS

| 4,407,381 A | 10/1983 | Oswald et al. |
| 4,732,053 A | 3/1988 | Gleasman et al. |
| 4,738,161 A | 4/1988 | Ivy |

(Continued)

FOREIGN PATENT DOCUMENTS

| EP | 1468859 A2 | 10/2004 |
| EP | 1468859 A3 | 5/2008 |

(Continued)

OTHER PUBLICATIONS

International Search Report mailed May 7, 2007, for PCT Application No. PCT/SE2007/050056 filed Feb. 2, 2007, 5 pages.

(Continued)

*Primary Examiner* — Erin D Bishop
(74) *Attorney, Agent, or Firm* — Morrison & Foerster LLP

(57) ABSTRACT

A differential gear, comprising a first releasable lock (42, 44) between a crown wheel (14) and the one drive shaft, a second, releasable lock (66, 68) between the crown wheel (14) and a differential housing (24), and a third releasable lock (74, 76) between the differential housing (24) and fixed vehicle part (26). The second and third locks are designed to be opened and locked alternately with one another. It is thereby possible to achieve drive shafts rotating in opposite directions to one another on the left and right side of the vehicle and thereby to achieve a center swiveling of the vehicle when the first lock (42, 44) is simultaneously kept in the locked position.

18 Claims, 9 Drawing Sheets

(56) References Cited

U.S. PATENT DOCUMENTS

| | | | |
|---|---|---|---|
| 6,951,259 B2 | 10/2005 | Irikura et al. | |
| 7,258,187 B2 * | 8/2007 | Bowen | 180/248 |
| 2005/0252707 A1 * | 11/2005 | Bowen | 180/235 |

FOREIGN PATENT DOCUMENTS

| | | |
|---|---|---|
| GB | 2115506 A | 9/1983 |
| GB | 2221518 A | 2/1990 |
| GB | 2228979 A | 9/1990 |
| WO | WO-93/05974 A1 | 4/1993 |

OTHER PUBLICATIONS

International Written Opinion mailed May 7, 2007, for PCT Application No. PCT/SE2007/050056 filed Feb. 2, 2007, 4 pages.

Extended European Search Report received for EP Patent Application No. 07709449.8, mailed on Jan. 26, 2010, 5 pages.

* cited by examiner

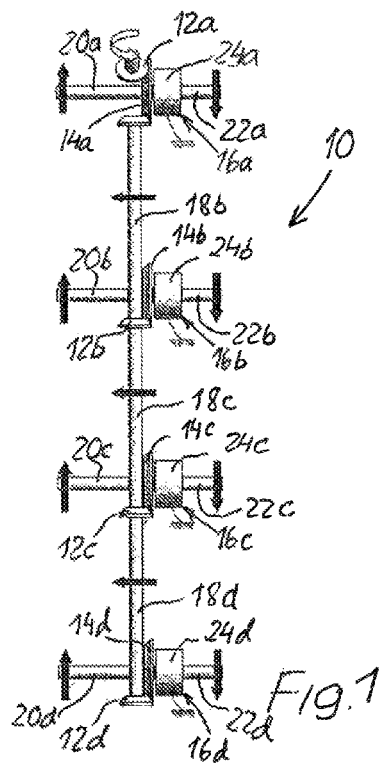
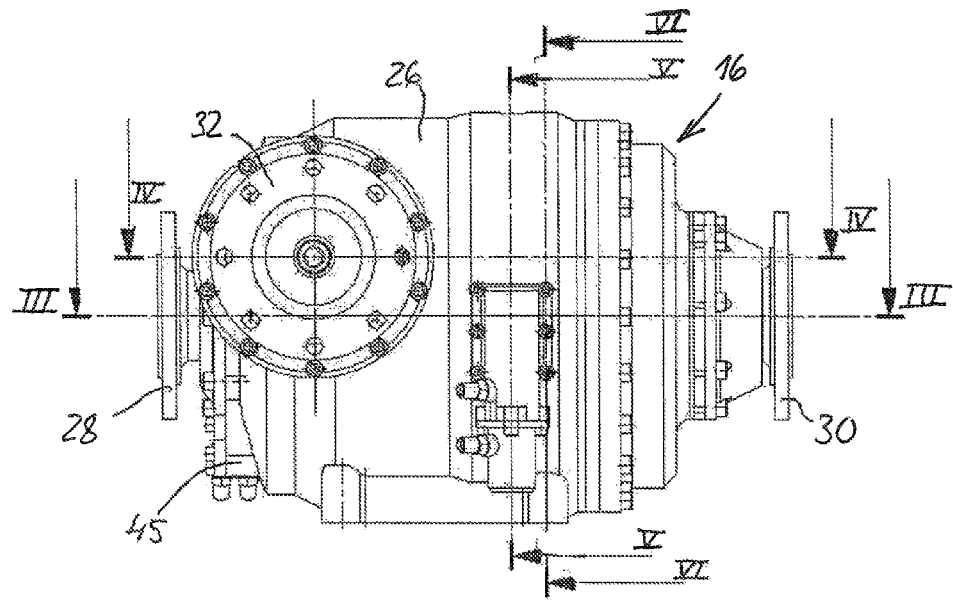

DIFFERENTIAL GEAR FOR A MULTI-SHAFT WHEELED MOTOR VEHICLE, AND A DRIVE TRAIN COMPRISING SEVERAL SUCH DIFFERENTIAL GEARS

CROSS REFERENCE TO RELATED APPLICATIONS

This is a U.S. National Phase of PCT/SE2007/050056, filed Feb. 2, 2007, which claims priority to Sweden Application No. 0600297-6, filed Feb. 10, 2006, both of which are hereby incorporated by reference in the present disclosure in their entirety.

TECHNICAL FIELD

The present invention relates to a differential gear for a multi-axle, wheeled vehicle, in particular a vehicle with drive to all axles, in which the differential gear comprises a differential housing associated with each wheel pair of the vehicle and coaxially connected to a respective crown wheel via a connection; a plurality of differential gears, which are rotatably supported in the differential housing and which mesh with a respective drive shaft gear for a left or a right drive shaft for the wheel pair, the axes of rotation of the drive shaft gears coinciding with the axis of rotation of the crown wheel; and a first, releasable lock between the crown wheel and the one drive shaft.

BACKGROUND ART

In order to permit a very light swiveling, a so-called center swiveling, of multi-axle, wheeled motor vehicles with drive to all axles, that is to say to get the vehicle to swivel on the spot about its essentially vertical central axis, it has previously been proposed to use separate drive lines for the left and right drive wheels of the vehicle, so that the left and right drive wheels can be made to rotate in opposite directions to one another when turning. Such a design makes this system intricate, heavy and expensive, and the system takes up a lot of space in the vehicle.

Another known proposal for achieving opposite directions of rotation of the left and right drive shafts in multi-axle, wheeled motor vehicles, and hence a center swiveling of the vehicle, for each wheel pair utilizes a separately controllable, reversing gear between a respective differential and drive shaft on one side of the vehicle. This makes the construction relatively bulky in the transverse direction of the vehicle.

DISCLOSURE OF INVENTION

An object of the present invention is to propose a compact differential gear, which in addition to the two conventional operating positions with an "open differential", that is to say the output drive shafts from the differential rotate in the same direction with the capacity to rotate at different speeds, and a "locked differential", that is to say where the drive shafts necessarily rotate at the same speed in the same direction, is designed also to allow the further operating position with "rotation of the drive shafts in opposite directions".

According to the invention, in a differential gear of the aforesaid type the connection between the crown wheel and the differential housing forms a second, releasable lock, and that the differential housing can be connected to a fixed vehicle part by way of a third releasable lock, the second and third locks being designed to be opened and locked alternately with one another. It is thereby possible, without any separate additional reversing gear, to achieve opposite directions of rotation of the drive shafts on the left and right side of the vehicle and thereby a central swiveling of the vehicle whilst simultaneously keeping the first lock in the locked position.

According to an alternative embodiment of a differential according to the invention for a multi-axle, wheeled vehicle with drive to all axles, a planetary gear train associated with each wheel pair of the vehicle is coaxially connected to a respective crown wheel by way of a connection and has a plurality of differential gears in the form of paired, intermeshing planet wheels at circumferentially separated points, said planet wheels being rotatably supported in a planet carrier, in which the one planet wheel in each pair also meshes with a surrounding annular wheel and the other planet wheel also meshes with a sun gear, the sun gear being designed to be connected to the one drive shaft of each wheel pair, whilst the planet carrier is designed to be connected to the other drive shaft of the wheel pair, together with a first, releasable lock between the crown wheel and the one drive shaft. The main outstanding characteristic of this embodiment is that the crown wheel can be connected to the surrounding annular wheel by way of a second, releasable lock, and that the annular wheel can be connected to a fixed vehicle part by way of a third, releasable lock, the second and third locks being designed to be opened and locked alternately with one another. Through this embodiment of the planetary gear the differential can be made even more compact.

The invention also relates to a drivetrain for multi-axle, wheeled motor vehicles with drive to all axles, in order to permit simultaneous rotation of the left and right drive shafts of the vehicle in opposite directions of rotation.

The invention will be described in more detail below with reference to drawings attached.

BRIEF DESCRIPTION OF DRAWINGS

FIG. 1 is a schematic plan view of a driveline for a four-axle, wheeled vehicle, incorporating differential gears according to the invention, and shows an operating situation in which the drive shafts on both sides of the vehicle rotate in opposite directions;

FIG. 2 is a side view of a differential gear according to the invention;

MODE(S) FOR CARRYING OUT THE INVENTION

Figure 3:
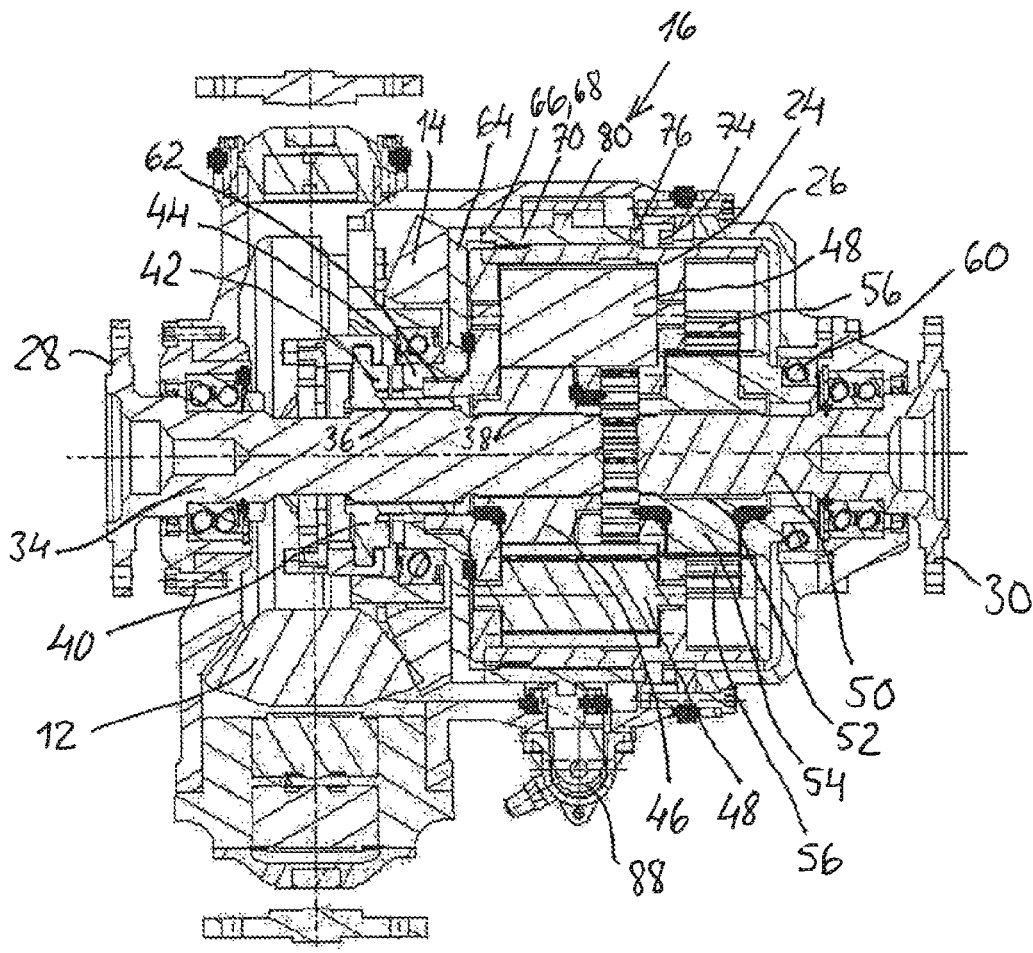
FIG. 3 is a longitudinal section taken along the line III-III in FIG. 2.

In FIG. 1, 10 serves to generally denote a schematically illustrated driveline for a four-axle, wheeled motor vehicle with drive to all axles. The driveline 10 comprises an input pinion 12a from an engine (not shown), which meshes with a crown wheel 14a of a first differential gear 16a for driving a first wheel pair of the vehicle. Cardan shaft sections 18b, 18c and 18d serve to drive three further differentials 16b, 16c and 16d by means of a respective pinion 12b, 12c and 12d, which mesh with associated crown wheels 14b, 14c and 14d respectively. Arrows in FIG. 1 indicate the directions of rotation of the input pinion 12a, the cardan shaft sections 18b-d and outgoing left drive shafts 20a-d and right drive shafts 22a-d in an operating situation, when the left drive shafts 20a-d rotate in an opposite direction to that of the right drive shafts 22a-d, so that the vehicle can be swiveled clockwise in FIG. 1 about an essentially vertical, central axis. In this operating situation the differential housings 24a-d of the respective differentials 16a-d are rotationally locked, as is indicated schematically and which will be described in more detail below.

FIG. 2 shows the outside of a differential gear 16 according to the invention, viewed laterally from behind in the direction of travel of the vehicle. The differential 16 has an outer housing 26, which is firmly anchored in the vehicle chassis. 28 denotes a left flange plate for connection to a left drive shaft (not shown), whilst 30 denotes a corresponding right flange plate for connection to a right drive shaft (not shown). 32 denotes a flange plate for connecting a cardan shaft section 18b-d between the respective differentials 16a-d in FIG. 1.

Figure 4:
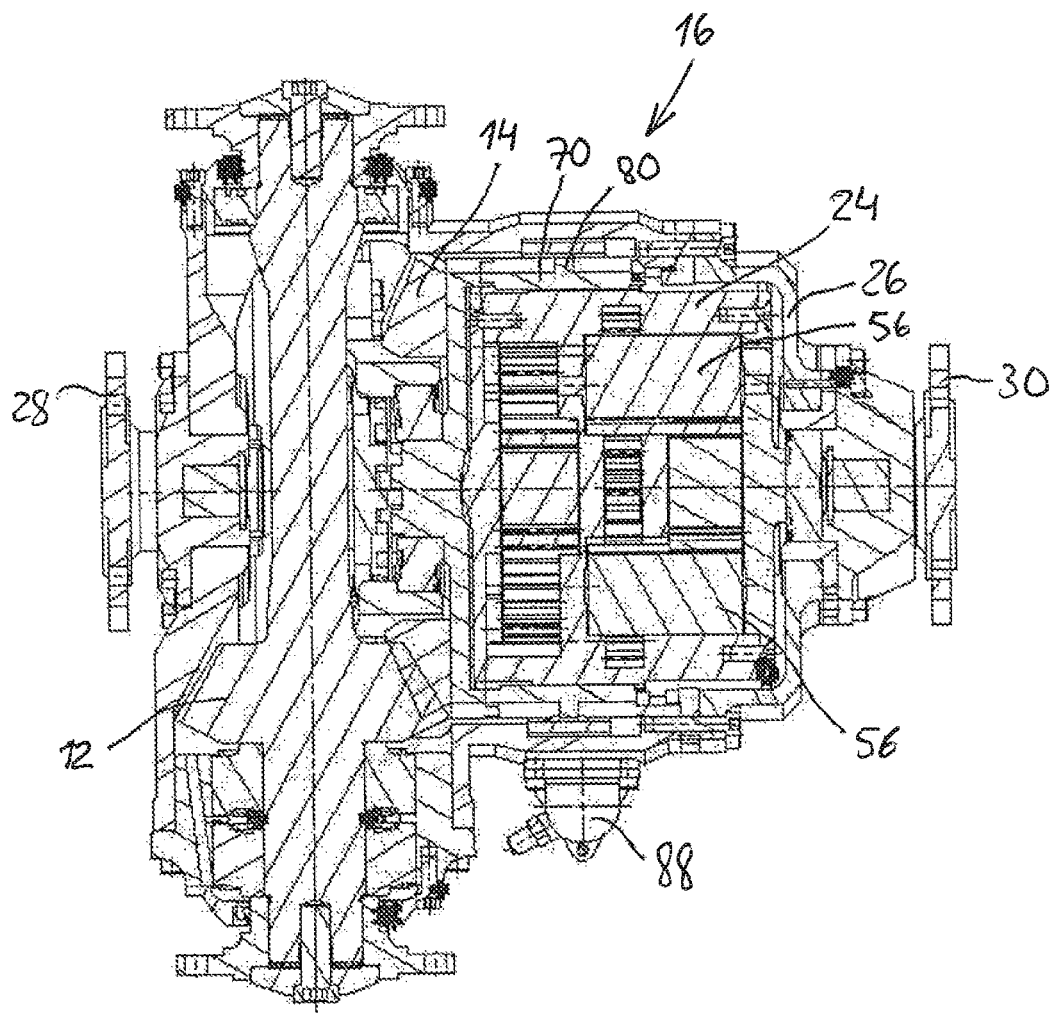
FIG. 4 is a longitudinal section taken along the line IV-IV in FIG. 2.

As FIGS. 3 and 4 show in more detail, each differential 16 comprises a left output shaft 34, which at its left end carries the flange plate 28 for connection to the left drive shaft 20a-d (FIG. 1) and which on its right part has a first splined section 36 and a second splined section 38. The first splined section 36 meshes with a surrounding, axially displaceable clutch plate 40, which on its one end side has a dog clutch configuration 42 for releasable coupling to a corresponding dog clutch configuration 44 of a crown wheel 14 of the differential 16. As previously stated, the crown wheel 14 is driven by a pinion 12 coupled to the cardan shaft sections 18b-d. The dog clutch connection 42, 44 forms a first releasable lock for locking the differential 16, so that the output drive shafts rotate at the same speed an in the same direction of rotation. A partially visible operating device 45 (see FIGS. 2 and 10), such as a hydraulic pressure cylinder, may be used for displacement of the clutch plate 40 engaging and disengaging with the crown wheel 14. An inner cylindrical gearwheel 46 (left drive shaft gear) is rotationally locked to the second splined section 38 of the shaft 34 and engages with four circumferentially spaced cylindrical differential gears 48 rotatably supported in a differential housing 24, as is best seen from FIG. 5.

Figure 10:
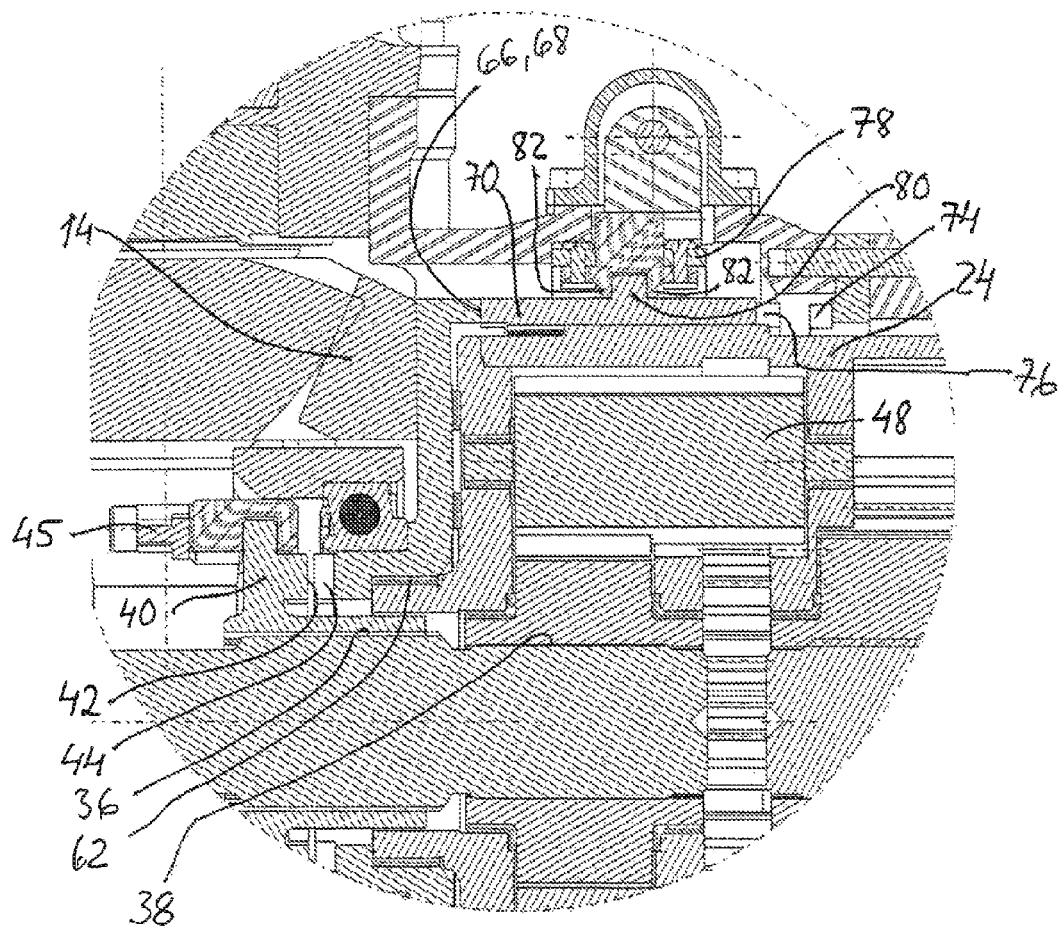
FIG. 10 on a larger scale shows a cross section of a section of the differential gear, showing parts of a mechanism for shifting the clutch ring between its position in FIGS. 7 and 8 on the one hand and that in FIG. 9 on the other.

Each differential 16 further comprises a right output shaft 50, which at its right end carries the flange plate 30 for connection to the right drive shaft 22a-d (FIG. 1) and which on its left part has a splined section 52. An inner cylindrical gearwheel 54 (right drive shaft gear) is rotationally locked to the splined section 52 of the shaft 50 and engages with four other circumferentially spaced cylindrical differential gears 56 rotatably supported in the differential housing 24 in a manner corresponding to that shown in FIG. 5, but displaced in the circumferential direction. The axes of rotation of the differential gears 48, 56 are parallel to one another and parallel to the axes of rotation of the output shafts 34, 50, which in turn are coaxial with the axis of rotation of the crown wheel 14. The differential gears 48, 56 furthermore overlap one another in the axial direction of the differential housing 24, in such a way that the differential gears 48, 56 intermesh over a part of their length, as can be seen from FIG. 6. The differential housing 24 is rotatable supported, among other things by way of a bearing 60, in relation to the surrounding, fixed outer housing 26 and by way of a slide bearing 62 in relation to the crown wheel 14 (FIGS. 3 and 10).

The description above relating to the actual differential gear 16 in principle belongs to the state of the art. In a conventional differential of this type there is normally a fixed connection between the crown wheel and the differential housing, causing the differential gears to rotate with the crown wheel and to transmit this rotation to the drive shafts, the latter rotating in the same direction of rotation and having the capacity for varying the speed, for example when cornering, when the differential is open, and with necessarily the same speed and in the same direction of rotation in the case of a locked differential, when the aforementioned first lock 42, 44 is in engagement (locked). p In order to permit not only these two operating positions but also a firer operating position, in which the drive shafts 20a-d, 22a-d can also be made to rotate in mutually opposite directions of rotation, so as to be able to swivel a multi-axle, wheeled vehicle about an essentially vertical, central axis, it is now proposed, according to the present invention, to introduce two further releasable locks into the differential 16, that is a second releasable lock (described below) between the crown wheel 14 and the rotatable differential housing 24, and a third, releasable lock (described below) between the differential housing 24 and the surrounding outer housing 26 fixed to the vehicle (or other fixed vehicle part), the second and third locks being designed to be locked (engaged) alternately with one another, so that the second lock is open at the same time that the third lock is locked, and vice-versa. This means that the rotation of the crown wheel 14 is now instead translated via the locked first lock 42, 44, the output shaft 34 and the drive shaft gear 46 into a rotation of the intermeshing differential gears 48, 56, which rotate in the now locked, stationary differential housing 24. Since the gears 56 rotate in the opposite direction to the gears 48, the output shaft 50 on the other side is made to rotate in the opposite direction to the output shaft 34 via the cylindrical drive shaft gear 54.

Figure 5:
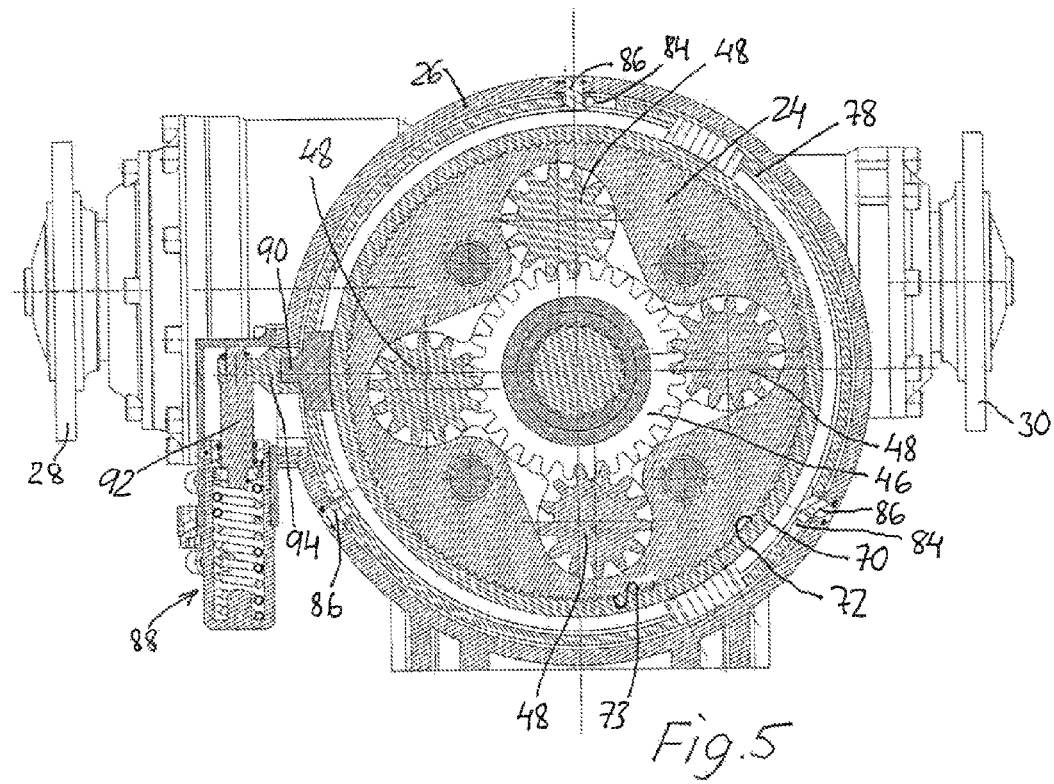
FIG. 5 is a cross section taken along the line V-V in FIG. 2.
Figure 6:
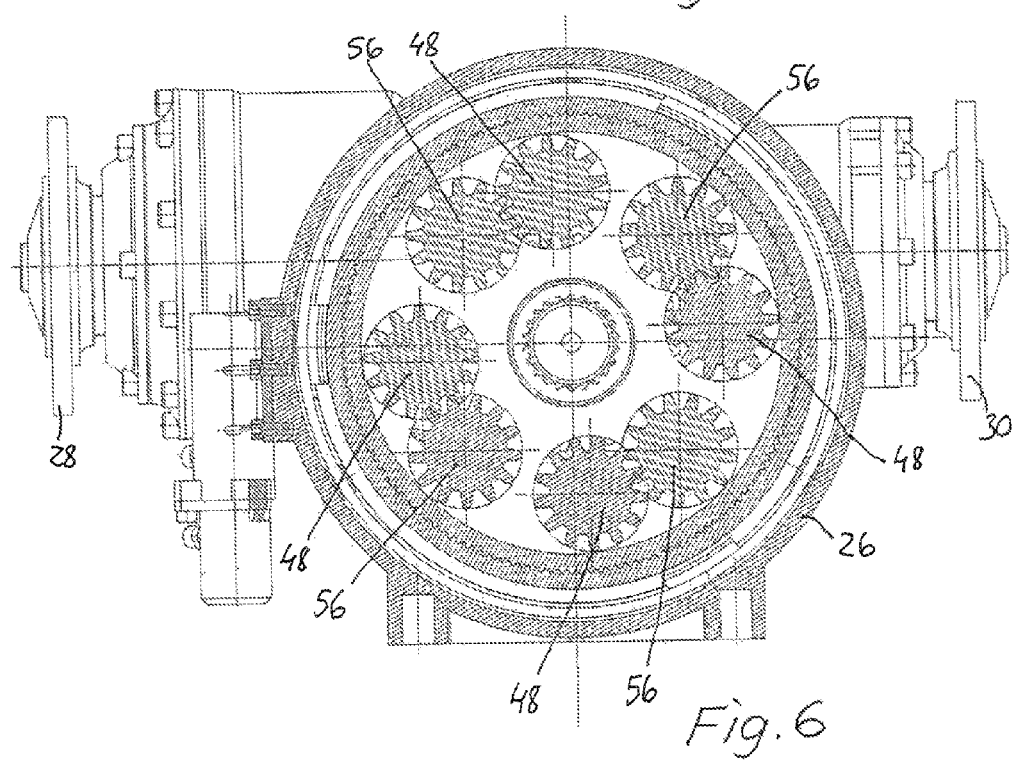
FIG. 6 is a cross section taken along the line VI-VI in FIG. 2.
Figure 7:
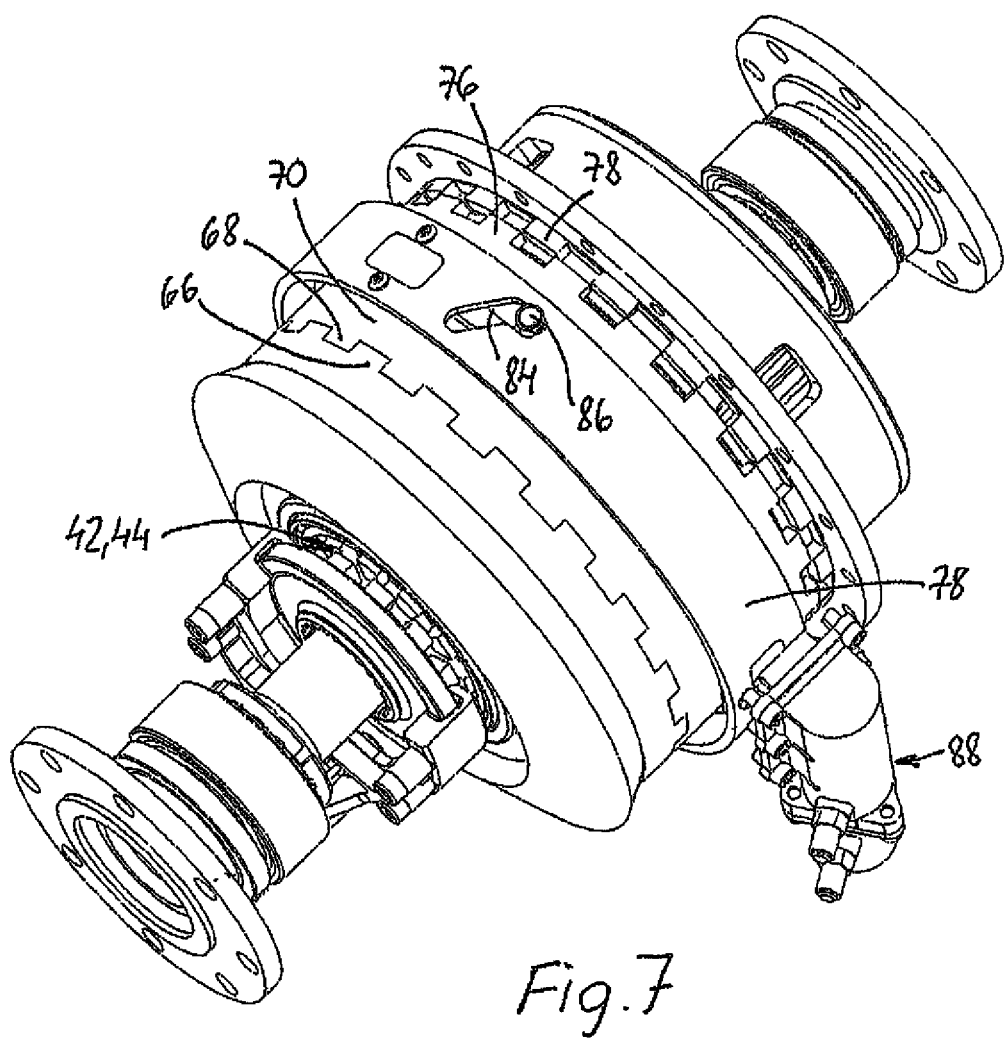
FIG. 7 is a perspective view of an open differential according to the invention with certain parts omitted.
Figure 8:
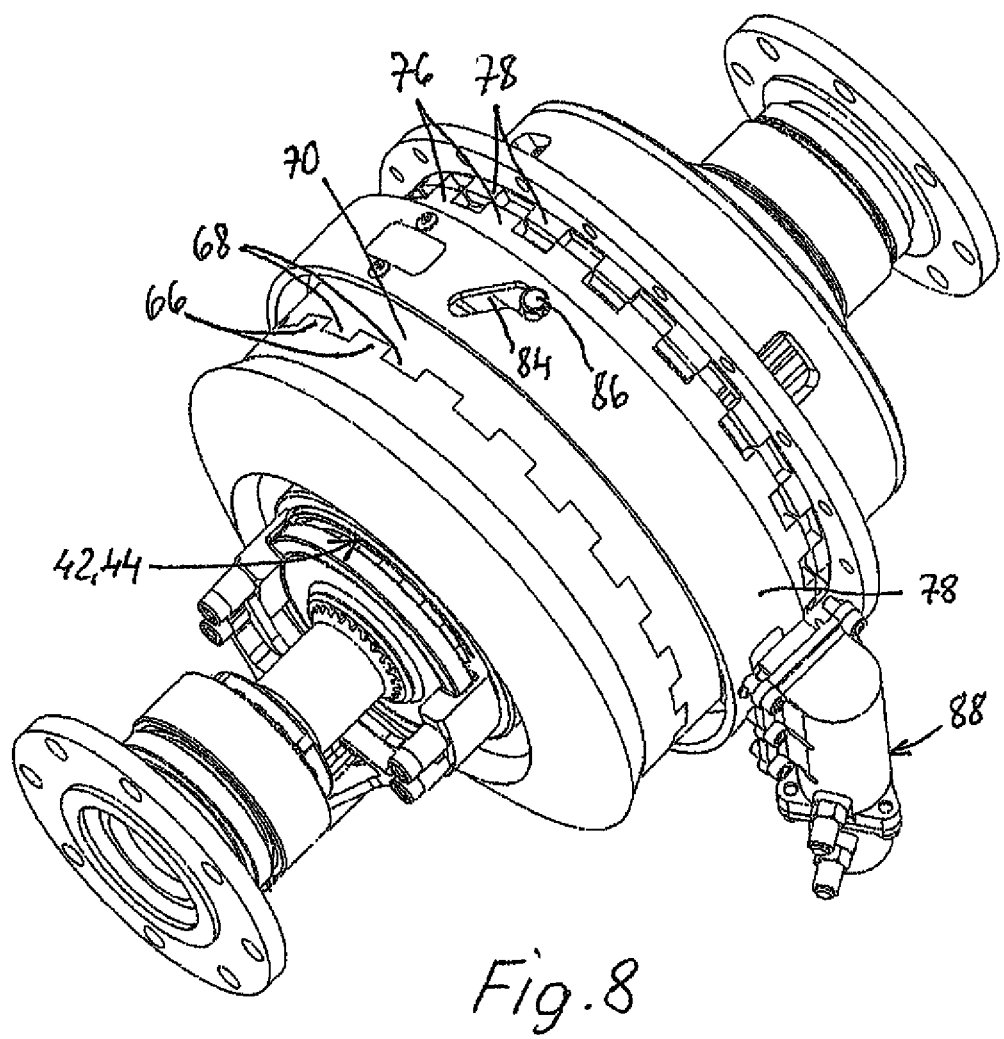
FIG. 8 is a perspective view of a locked differential according to the invention with certain parts omitted.

The second, releasable lock comprises an annular part 64, which is connected to the crown wheel 14 and which on its side remote from the crown wheel 14 has a dog clutch configuration 66, designed to interact with a corresponding dog clutch configuration 68 on the left end edge of a clutch ring 70 surrounding the differential housing 24, as can be seen from FIG. 3, 7-9, The clutch ring 70 has internal splines 72, which mesh, axially displaceable, with external splines 73 on the outside of the housing 24 (FIG. 5).

The third releasable lock comprises a dog clutch configuration 74, which is integrally formed with the fixed outer housing 26 and is designed to interact with a dog clutch configuration 76 on the right end edge of the clutch ring 70. The clutch ring 70 therefore constitutes a common lock or clutch part for the second and third locks. As will be seen in more detail in FIG. 7-10, the clutch ring 70 is axially displaceable between its alternating engagement positions with the annular dog clutch part 64 and the dog clutch configuration 74 integrally formed with the fixed outer housing 26 by means of an operating sleeve 78, which surrounds the clutch ring 70.

The clutch ring 70 has a radially projecting, circumferential rib 80, which is bounded by a plurality of slide elements 82 (or roller elements) which, circumferentially spaced, are fixed to the inside of the operating sleeve 78 and which slide against the opposing sides of the rib 80, in order to allow the clutch ring 70 to rotate relative to the operating sleeve 78 in three different operating positions of the differential, whilst the operating sleeve 78 remains axially and circumferentially stationary. As will be seen from FIGS. 5 and 7-9, slanting guide grooves 84 are made in the operating sleeve 78 at a minimum of three points around the circumference of the sleeve, in which grooves radial guide pins 86 engage, which are fixed in the outer housing 26. As is shown in FIG. 5, a tangentially arranged operating device, such as hydraulic pressure cylinder 88, engages with an axially aligned driver element 90 on the outside of the operating sleeve 78, via a gripper shoe 94, which is fitted to the piston rod 92 of the operating device 88 and which is capable of translating an axial movement of the piston rod 92 into a limited rotational movement of the operating sleeve 78, whilst still allowing a limited axial sliding movement of the operating sleeve 78. On activation of the operating device 88, the guide pins 86 will slide in the slanting guide grooves 84 in the operating sleeve 78, thereby displacing the latter axially together with the clutch ring 70, to which this axial movement is imparted via the lateral pressure of the slide elements 82 on the rib 80. Depending on the direction of movement of the piston rod 92, the clutch ring 70 will thereby be displaced between its coupling position with either the crown wheel 14 or the fixed outer housing 26.

Figure 9:
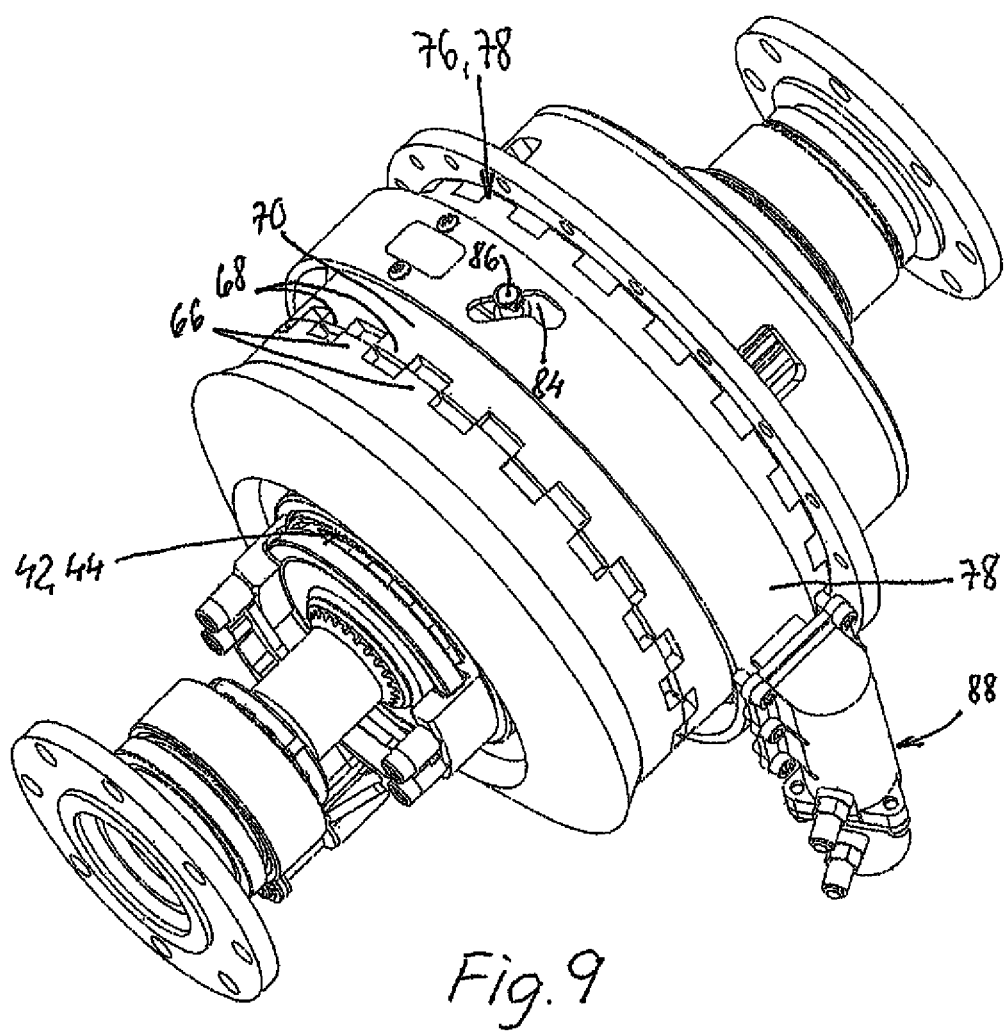
FIG. 9 is a perspective view of a differential according to the invention with certain parts omitted and shows the differential in an operating position for center swiveling of a vehicle.

When shifting between the three operating positions of the differential gear 16 according to the invention, the vehicle is brought to a halt, following which the desired operating position is selected by means of the axial and tangential operating devices. In normal driving, "open differential" (FIG. 7) is selected, that is to say only the second look is locked, the drive shafts rotating in the same direction of rotation with the capacity for varying the speed, as when cornering. When the "locked differential" operating position (FIG. 8) is required, the second lock is also locked, the drive shafts necessarily rotating at the same speed. In order to allow a so-called center swiveling of the vehicle, for example when turning the vehicle on a road, the third lock 74, 76, as shown in FIG. 9, is locked together with the first lock 42, 44, whilst the second lock 66, 68 is open, so that the drive shah on one side of the vehicle will necessarily rotate in an opposite direction to the drive shafts on the other side.

Even though the differential gear 16 shown and described is of a type which comprises a differential gear 48, 56 that is supported in the differential housing 24 with its axes of rotation parallel to the central axes of the crown wheel 14 and the output shafts 34, 50, it is possible, without departing from the scope of the present invention, to apply the principle of three releasable locks (clutches) correspondingly in a modification of a differential gear of the conventional type having differential gears with their shafts supported radially in the differential housing. Such an embodiment is represented schematically in FIG. 11, in an operating situation in which the left and right drive shaft LDS and RDS rotate in opposite directions for center swiveling of a vehicle (not shown). A cardan shaft pinion CBP meshes with a crown wheel CW, which can be connected via a first releasable lock (clutch C1) to the left drive shaft LDS and via a second releasable lock (clutch C2) to a holder or "differential housing" DH, which carries at least two differential gears DG, which are supported with their shafts at right angles to the drive shafts LDS and RDS and which mesh with a left and right drive shaft gear LDSG and RDSG respectively. The holder or "differential housing" DH can be connected via a third releasable lock (clutch C3) to a fixed vehicle part FVP.

Figure 11:
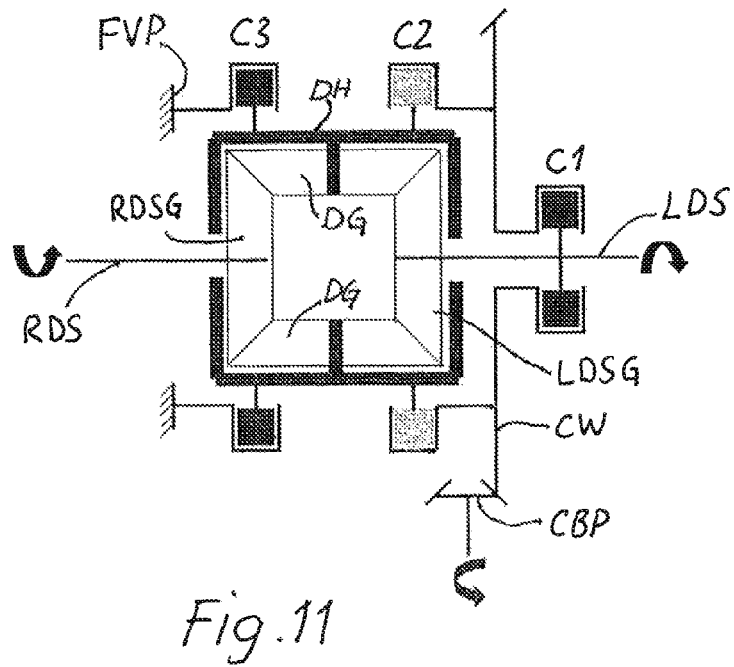
FIG. 11 schematically shows an alternative, functionally equivalent embodiment of the differential gear according to the invention.

In the operating position shown in FIG. 11, the clutches C1 and C3 are closed (engaged) whilst the clutch C2 is disengaged (shown in a light gray scale), the crown wheel CW via the clutch C1 necessarily propelling the left drive shaft LDS, as is shown by the arrow D1, whilst the right drive shaft RDS is made to rotate in the opposite direction (the arrow D2) in that the drive shaft LDS via the drive shaft gear LDSG rotates the fixed differential gears DG, which in turn rotate the drive shaft gear RDSG and thereby the drive shaft RDS in the direction of the arrow D2.

In the normal operating position with "open differential", the clutches C1 and C3 are kept disengaged (open) and the clutch V2 is kept closed, whilst in the operating position with "locked differential" the clutches C1 and C2 are closed and the clutch C3 is kept disengaged (open). The clutches C2 and C3 are thus closed alternately with one another. All three operating positions therefore function wholly like the first embodiment according to FIG. 1-10.

Figure 12:
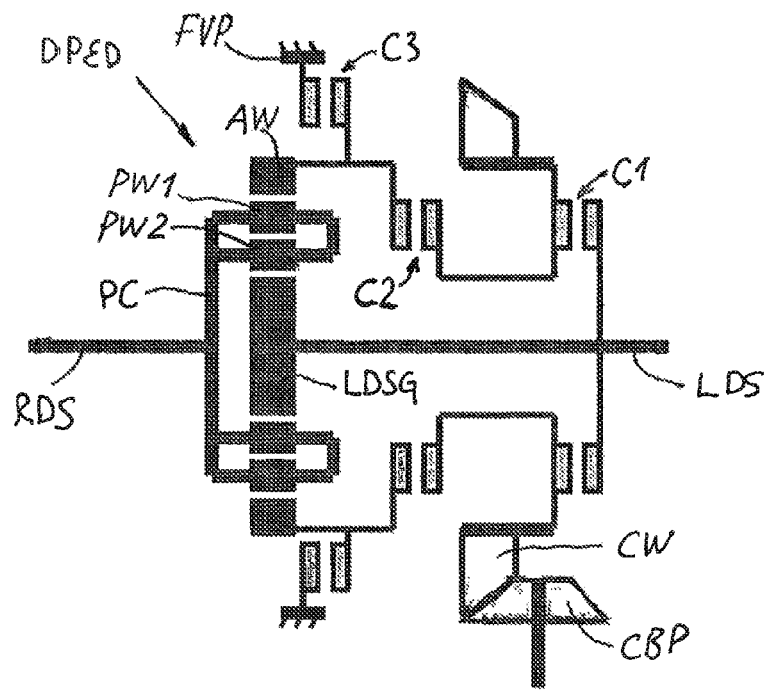
FIG. 12 also schematically shows a further embodiment of a differential according to the invention of planetary gear train type.

FIG. 12 shows a further feasible embodiment of a double planet epicyclic differential (DPED) according to the present invention of planetary gear train type. In this embodiment there are likewise three releasable locks (clutches), that is to say a first releasable lock (clutch C1) between the crown wheel CW and the left drive shaft LDS, a second releasable lock (clutch C2) between the crown wheel CW and an outer annular wheel AW with internal gearwheels of the differential DPED, and a third releasable lock (clutch C3) between the annular wheel AW and a fixed vehicle part FVP, In this case the left drive shaft gear LDSG consists of a sun gear of a planetary gear train, whilst the right drive shaft RDS is connected to a planet carrier PC of the planetary gear train. The planet carrier PC carries pairs of intermeshing planet wheels PW1 and PW2, in which the one planet wheel PW1 in each pair also meshes with the annular wheel AW and the other planet wheel PW2 also meshes with the sun gear LDSG.

Like the embodiments previously described, this embodiment also has three possible operating positions, that is to say a first, "open" operating position in which the clutches C1 and C3 are disengaged (open) and the clutch C2 is closed, so that both of the drive shafts LDS and RDS can rotate in the same direction at the same or different speeds, a second "locked" operating position, in which the clutches C1 and C2 are closed and the clutch C3 is open, so that the drive shafts LDS and RDS necessarily rotate in the same direction and at the same speed, and a third operating position, in which the clutches C1 and C3 are closed and the clutch C2 is open, the two drive shafts LDS and RDS being made to rotate in opposite directions for executing a center swiveling of the vehicle.

p It should be noted that the terms "left" and 'right' in respect of the vehicle drive shafts as denoted above and in the following patent claims can naturally be reversed, depending on the actual, selectable location of the crown wheel in the differential gear.

The invention claimed is:
1. A differential gear for a multi-axle wheeled vehicle, the vehicle having drive to all axles, the differential gear comprising:
  a differential housing which is associated with a wheel pair of the vehicle and is coaxially connected to a respective crown wheel;
  a plurality of differential gears, which are rotatably supported in the differential housing, wherein:

a first subset of the differential gears meshes with a first drive shaft gear, and the first drive shaft gear is configured to drive a first drive shaft of the wheel pair, a second subset of the differential gears meshes with a second drive shaft gear, and the second drive shaft gear is configured to drive a second drive shaft of the wheel pair, and an axis of rotation of the first drive shaft gear and an axis of rotation of the second drive shaft gear coincide with an axis of rotation of the crown wheel; and a first releasable lock between the crown wheel and the first drive shaft, wherein the connection between the crown wheel and the differential housing forms a second releasable lock, and the differential housing can be connected to a fixed housing part by way of a third releasable lock, the second and third locks being designed to be opened and locked alternately with one another.

2. The differential gear as claimed in claim 1, further comprising: a clutch ring, the clutch ring being rotationally locked to the differential housing and axially displaced to the differential housing, wherein the second releasable lock comprises a first clutch side of the clutch ring, and the first clutch side can be rotationally locked to the crown wheel.

3. The differential gear as claimed in claim 2, wherein the third releasable lock comprises a second clutch side of the clutch ring, opposite the first clutch side, that can be releasably connected to the fixed housing part.

4. The differential gear as claimed in claim 3, wherein the first clutch side and the second clutch side of the clutch ring are dog clutches, the second releasable lock further comprises a first dog clutch configuration that interacts with the first clutch side, wherein the first dog clutch configuration is on a first clutch half, and the first clutch half is rotationally locked to the crown wheel, and the third releasable lock further comprises a second dog clutch configuration, wherein the second dog clutch configuration is connected to the fixed housing part.

5. The differential gear as claimed in claim 3, further comprising an operating element for selective axial displacement of the clutch ring so that the clutch ring engages and disengages with a first clutch half, wherein the first clutch half is rotationally locked to the crown wheel.

6. The differential gear as claimed in claim 5, wherein the operating element is designed to produce a selective axial displacement of the clutch ring so that the clutch ring is alternately in locking engagement with the crown wheel and the fixed housing part.

7. The differential gear as claimed in claim 5, wherein the operating element comprises an annular operating sleeve, and wherein the annular operating sleeve surrounds the clutch ring and is provided with driver elements designed for axial lateral displacement of the clutch ring from an engagement position with the crown wheel to an alternative engagement position with the fixed housing part, and vice-versa.

8. The differential gear as claimed in claim 7, wherein the driver elements comprise slide elements and the slide elements adjoin a radially projecting rib on the clutch ring.

9. The differential gear as claimed in claim 7, wherein the operating element further comprises at least three pin-groove mechanisms, each pin-groove mechanism having a pin and a groove, and wherein the at least three pin-groove mechanisms are evenly spaced in a circumferential direction between the operating sleeve and the fixed housing part.

10. The differential gear as claimed in claim 9 wherein: each of the grooves is a slanting guide groove, and wherein each of the pins is a guide pin anchored in the fixed housing part, and each of the pins is designed to engage in each of the respective slanting guide grooves in the operating sleeve.

11. The differential gear as claimed in claim 9, wherein the operating element further comprises at least one tangentially acting drive device designed to rotate the operating sleeve in the circumferential direction while allowing a limited axial movement of the operating sleeve and the clutch ring, and wherein the limited axial movement is allowed by way of the driver elements and the at least three pin-groove mechanisms.

12. The differential gear as claimed in claim 2, wherein the clutch ring is axially displaceable to the differential housing via a splined connection.

13. The differential gear as claimed in claim 1, wherein the first releasable lock between the crown wheel and the first drive shaft comprises a clutch plate, the clutch plate is supported so that it is rotationally locked and axially displaceable on an output shaft in the differential gear, and the clutch plate is designed to be capable of engagement with a second clutch half associated with the crown wheel.

14. The differential gear as claimed in claim 13, further comprising an axially acting drive device designed to displace the clutch plate into and out of an engagement position with the second clutch half associated with the crown wheel.

15. The differential gear as claimed in claim 14, wherein a first clutch half of the crown wheel is arranged on an outer peripheral part of a first side of the crown wheel, and the second clutch half is arranged on a radially inner hub part of a second side of the crown wheel.

16. The differential gear as claimed in claim 1, wherein each of the differential gears comprises an axis of rotation, and the axes of rotation for each of the differential gears are parallel, and wherein the differential gears intermesh in pairs with one another in an axially overlapping relationship at circumferentially separated points around the first and second drive shafts.

17. The differential gear as claimed in claim 1, wherein each of the differential gears comprises an axis of rotation, and the axes of rotation for each of the differential gears are at right angles to the first and second drive shafts, and wherein each differential gear meshes with both the first and second drive shaft gears at circumferentially separated points around the first and second drive shafts.

18. The differential gear as claimed in claim 1, wherein the third releasable lock is designed to be kept in a locked position while the first releasable lock is in a locked position and the second releasable lock is in an open position, in order to permit rotation of the first and second drive shafts in opposite directions of rotation.

* * * * *